March 26, 1935.  F. D. COLETTA  1,995,565
ELASTIC FLUID TURBINE
Filed June 29, 1934  2 Sheets-Sheet 1
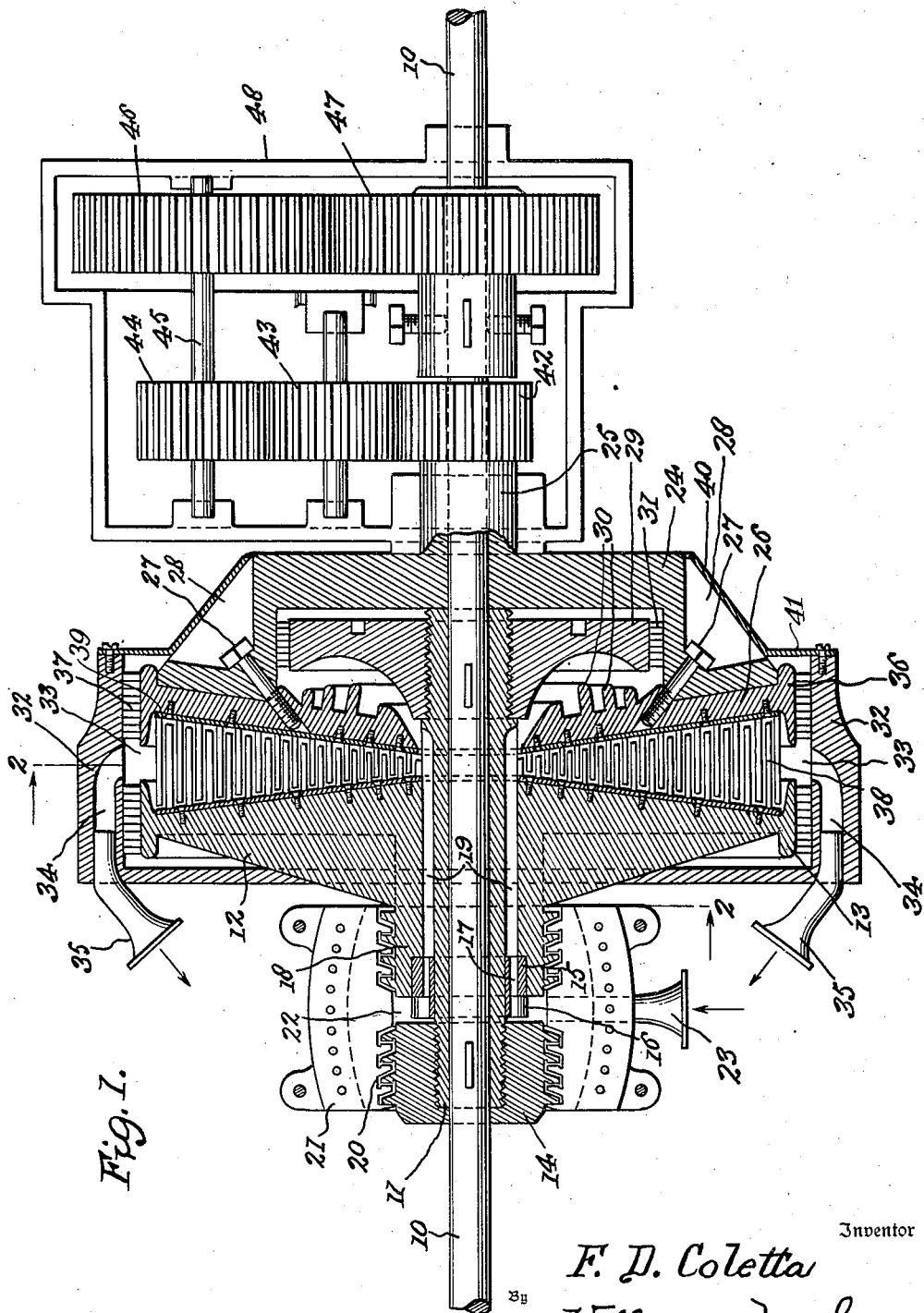
Fig. I.
Inventor
F. D. Coletta
By Wilkinson & Mawhinney
Attorneys.

March 26, 1935.    F. D. COLETTA    1,995,565
ELASTIC FLUID TURBINE
Filed June 29, 1934    2 Sheets-Sheet 2
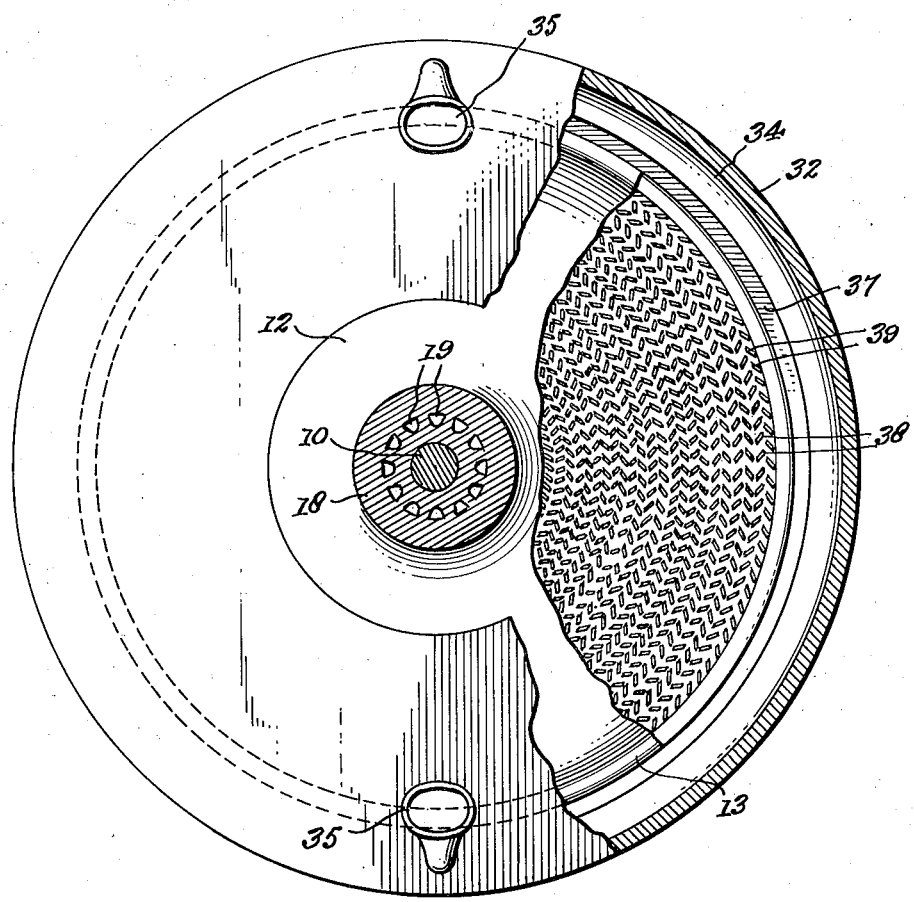
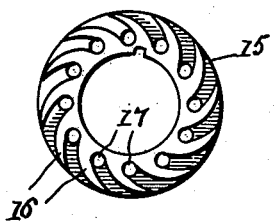 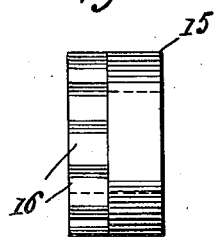 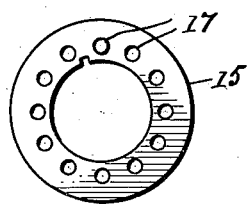
Inventor
F. D. Coletta
By Wilkinson & Mawhinney
Attorneys.

Patented Mar. 26, 1935

1,995,565

UNITED STATES PATENT OFFICE 1,995,565

ELASTIC FLUID TURBINE

Fiorindo D. Coletta, Alfredo Chaves, Brazil

Application June 29, 1934, Serial No. 733,097
In Brazil July 31, 1933

2 Claims. (Cl. 253—16.5)

The present invention relates to elastic fluid turbines of the radial flow blade type, and has for an object to provide a simplified construction with relatively few bearings and wherein the parts are so constructed that great strength is obtained in a relatively small structure and wherein a pair of opposed oppositely rotatable rotors are employed with means for taking off the power from the rotors and directing the power to a common shaft driven in one direction.

Another object of the present invention is to provide an improved thrust means between the oppositely rotatable rotors wherein the pressure is balanced by the elastic fluid to offset end thrust on the supporting bearings.

Another object of the present invention is to provide an improved fluid distributor for conducting the elastic fluid into the working chamber uniformly at different points thereof to insure the even expansion of the fluid throughout the chamber and against the various blades employed.

The invention has for a further object an improved mounting for the blades which admits of quick and easy manufacturing and assembling of the parts of the motor and which provides for strengthening the blades and holding them in their true positions.

Among the various other objects and advantages of the invention is to provide a turbine of this character which may easily be converted for different uses and wherein the structure is capable of use in a turbine wherein but one rotor is used; and wherein the amount of packing required is reduced to a minimum, and a structure which is capable of being coupled in multiple in various stages of low pressures.

Another feature of the invention resides in a peculiar construction wherein the working chamber may be proportioned in cross sectional area to accommodate the expansion of various elastic fluids under various conditions, and wherein the radial blades may be proportionately increased in cross sectional area from the smaller to the larger end of the working chamber to utilize to the fullest extent the full pressure of the fluid during expansion.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a longitudinal section taken through an elastic fluid turbine constructed according to the present invention, and showing one means of coupling the oppositely rotatable rotors to the drive shaft.

Figure 2 is a transverse medial section taken through the turbine on the line 22 of Figure 1 and showing the concentric rows of opposed radial blades.

Figure 3 is a detail outer end view of the fluid distributor, showing the spiral entrance ports for the incoming fluid.

Figure 4 is a side elevation of the same, and

Figure 5 is an inner end view of the distributor.

Referring now to the drawings, 10 designates a shaft which may extend throughout the length of the turbine and also through the coupling or transmission mechanism associated therewith, as shown in Figure 1. Keyed to the shaft 10 is the hub 11 of a rotor 12. The rotor 12 is of substantially disc form with conical outer and inner faces tapering radially from the hub 11 and terminating in a peripheral rim 13 having an outer cylindrical bearing surface for receiving packing thereagainst as will subsequently appear.

The outer end of the hub 11 is screw threaded to receive thereon a nut 14 which abuts a fluid distributor 15, shown in detail in Figures 3, 4 and 5. The distributor is of cylindrical form and slidably fits upon the hub 11 and is provided at its outer end adjacent the nut 14 with an entrance portion comprising a plurality of substantially spiral passages 16 opening and flaring through the peripheral surface of the distributor and terminating at their inner ends in longitudinal passages or openings 17 disposed in parallel relation to the shaft 10 and adapted to carry or direct the elastic fluid from the inlet passages 16 inwardly through the distributor. The hub 11 is provided at the outer side of the rotor 12 with an enlargement 18 counterbored about the main portion of the hub 11 and receiving therein the inner end of the distributor 15. The enlargement 18 is provided with a plurality of axially extending passages 19 which lead from the openings 17 in the distributor and extend entirely through the rotor 12 and beyond the same in the outer surface of the hub 11. The enlarged portion 18 of the hub, and the nut 14 are provided with the packing glands or ribs 20 sealed in a bearing 21 adapted to support the adjacent end of the turbine and it will be noted that the ribs 20 are inclined in opposite directions so as to effectively seal the bearing about the nut and the hub. The outer end portion of the distributor 15 serves as a spacer between the enlarged portion 18 and the nut 14 and provides therebetween and within the bearing 21 an annular intake chamber 22 which communicates with an intake coupling 23 for the reception of steam or other elastic fluid.

Freely rotatable on the opposite end of the shaft 10, and abutting the end of the hub 11, is a second rotor 24 which has an outwardly extending hub 25 freely rotatable on the shaft 10 and which is dished at its inner side and partially closed thereat by an annular rotor plate 26 which is opposed to the rotor 12 and which has a conical inner face forming with the inner face of the rotor 12 an outwardly flaring annular working chamber. The plate 26 is substantially a part of the rotor 24 and is held thereto by bolts 27 or the like as shown, the bolts 27 being countersunk in recesses 28 provided in the outer tapering portion of the rotor 24. A thrust disc 29 is disposed in the cavity of the rotor 24 and is threaded or otherwise suitably secured upon the hub 11. The thrust disc 29 is provided with an inner concave annular surface opposed to the inner side of the rotor plate 26 and spaced therefrom to provide an annular fluid receiving chamber for setting up a counter pressure at the back of the plate 26 to maintain the same against endwise thrust from the rotor 12. The plate 26 may be strengthened by a plurality of annular ribs 30, and a packing 31 may be interposed between the periphery of the thrust disc 29 and the inner wall of the rotor 24 to seal the disc 29 therein and thus seal the thrust chamber.

A fixed casing 32 surrounds both of the rotors and is provided with an annular exhaust chamber 33 having a desired number of exhaust ports 34 leading to exhaust connections 35 for conducting the expended or partially expended elastic fluid from the turbine. The rotor plate 26 is provided with an outer marginal rim 36 similar to the rim 13, and these rims 13 and 36 are sealed in the casing 32 by annular packing glands or rings 37 disposed at opposite sides of the exhaust chamber 33 to prevent leakage of the exhaust fluid after passing outwardly from the working chamber.

The rotors carry concentric radially alternating rows of blades 38 with the blades of alternate rows carried by the rotor 12 and the blades or intermediate rows carried by the rotor 24 through the plate 26. These blades 38 are preferably mounted upon backing discs or plates 39 which are suitably secured against the inner opposite faces of the rotors and the blades extend crosswise of the working chamber and are alternately and oppositely inclined so as to offer the desired resistance to radial expansion of the elastic fluid as the latter moves radially through the working chamber. The arrangement of the blades 38 is shown to advantage in Figure 2 and it will be evident that the expansion of the fluid will exert opposite tangential pressures upon the blades 38 so as to turn the rotors in opposite directions and with the same relative speed and force. To facilitate assembling and separation of the parts, the casing 32 is provided at one end with a frusto-conical sheath 40 which is provided at its larger end with an attaching flange 41 secured by screws or the like to the end of the casing 32 as shown in Figure 1.

This sheath 40 overlies the tapering outer end of the rotor 24 and also encloses the recesses 28. The body or main portion of the casing 32 is provided with a suitable opening at its other end for the reception of the hub and adjacent parts of the rotor 12. Any suitable means may be employed for reinforcing or strengthening the blades 38, and for the sake of clearness various portions of the turbine are omitted as having no part of the present invention but which of course are essential in the actual construction and for the maintenance and operation of the turbine.

In Figure 1, however, the hub 25 of the rotor 24 is provided with a pinion 42 which meshes with the reverse pinion 43 and the latter is in mesh with a third pinion 44 carried upon a countershaft 45. The shaft 45 carries a gear wheel 46 which meshes with a second gear wheel 47 keyed or otherwise secured upon the shaft 10 so that the power transmitted from the rotor 24 is through the train of gears transmitted to the shaft 10. As the rotor 12 is keyed directly to the shaft 10 through its hub 11 the shaft 10 also is driven by the rotor 12. The train of gears is suitably mounted in a gear box or case 48, suitable shafts and bearings being provided for the various pinions and gear wheels.

The hub 11, nut 14, rotor 12 with its parts, and the thrust disc 29 make up with the shaft 10 and gear wheel 47 one of the rotary units of the turbine to turn in one direction.

The rotor plate 26 with its parts, and the rotor 24 with its hub 25 and pinion 42 comprise the other rotary unit of the turbine to turn in the other direction.

By means of the train of gears 43, 44, and 46 the efforts of these two oppositely rotatable units are combined in one direction and taken off through the shaft 10 comprising a part of one of the units.

The elastic fluid enters the inlet 23 and passes through the ducts 19 into the V-shape working chamber for contact with the blades 38 and 39 both rotors to equally distribute the pressure of the elastic fluid between the walls of the rotors and their respective blades 38 and 39 which are disposed in parallel relation to the axis of the shaft 10. On account of this construction there is no axial thrust but a tangential one in the true direction of the rotation of the shaft 10. The rows of blades carried by both rotors are all movable in the line of impact and directly take up the thrust of the elastic fluid.

For this reason the improved turbine will deliver more power with the same combustible mixture than present known and used turbines, and this increase in power will be several times greater than heretofore.

It is obvious that various changes and modifications may be made in the details of construction and design of the above specifically described embodiment of this invention without departing from the spirit thereof, such changes and modifications being restricted only by the scope of the following claims:—

What is claimed is:—

1. In an elastic fluid turbine, a shaft, a rotor fixed on said shaft, a second rotor rotatably mounted on the shaft and spaced from the first rotor, a distributor carried by the first rotor for receiving elastic fluid under pressure, said first rotor having passages therein leading from the distributor to the space between the rotors, said second rotor having a cavity therein, a thrust-disc connected to the first rotor and disposed in said cavity and sealed against the peripheral wall thereof, said second rotor having a passage leading from the space between the rotors to said cavity for receiving elastic fluid in said cavity against the disc and counteracting the thrust between the rotors, and interfitting blades carried by the rotors in parallel relation to the shaft for receiving the elastic fluid thereagainst to turn the rotors in opposite directions.

2. In an elastic fluid turbine, a shaft, a rotor fixed to the shaft and having a hub with longitudinal passages therein, a distributor fitting in the outer end of the hub and having passages therein leading to said passages in the hub and provided with spiral peripheral inlet openings at its outer end leading to the passages in the distributor, a bearing sealed about the hub and having an inlet chamber for elastic fluid under pressure, a second rotor mounted to turn on the shaft and spaced from the first rotor and provided with a chamber therein, a disc connected to the hub of the first rotor and disposed in said chamber with an outer face spaced from the inner wall of the chamber, said chamber communicating with the space between the rotors for receiving elastic fluid from said passages to equalize pressure of fluid against the opposite sides of the second rotor, and rows of concentric blades carried by the rotors and disposed alternately in parallel relation to the shaft for converting radial pressure of the elastic fluid into tangential pressure in opposite directions on the rotors.

FIORINDO D. COLETTA.